US009152925B2

(12) United States Patent
Nagaraj et al.

(10) Patent No.: US 9,152,925 B2
(45) Date of Patent: Oct. 6, 2015

(54) METHOD AND SYSTEM FOR PREDICTION AND ROOT CAUSE RECOMMENDATIONS OF SERVICE ACCESS QUALITY OF EXPERIENCE ISSUES IN COMMUNICATION NETWORKS

(71) Applicant: Nokia Siemens Networks OY, Espoo (FI)

(72) Inventors: Shirish Nagaraj, Hoffman Estates, IL (US); Kashyap Kamdar, Palatine, IL (US); Mark Allen Schamberger, South Elgin, IL (US); Pradap Konda, Bangalore (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 278 days.

(21) Appl. No.: 13/796,354

(22) Filed: Mar. 12, 2013

(65) Prior Publication Data

US 2013/0238534 A1    Sep. 12, 2013

Related U.S. Application Data

(60) Provisional application No. 61/609,529, filed on Mar. 12, 2012.

(51) Int. Cl.
| | |
|---|---|
| *G06N 99/00* | (2010.01) |
| *H04L 12/24* | (2006.01) |
| *H04W 24/00* | (2009.01) |
| *H04W 24/04* | (2009.01) |
| *H04W 24/08* | (2009.01) |

(52) U.S. Cl.
CPC .......... *G06N 99/005* (2013.01); *H04L 41/0206* (2013.01); *H04L 41/0213* (2013.01); *H04L 41/04* (2013.01); *H04L 41/0631* (2013.01); *H04L 41/145* (2013.01); *H04L 41/147* (2013.01); *H04L 41/5067* (2013.01); *H04L 41/069* (2013.01); *H04L 41/142* (2013.01); *H04L 41/16* (2013.01); *H04W 24/00* (2013.01); *H04W 24/04* (2013.01); *H04W 24/08* (2013.01)

(58) Field of Classification Search
CPC ................................................... G06N 99/005
See application file for complete search history.

(56) References Cited

U.S. PATENT DOCUMENTS

| | | | | |
|---|---|---|---|---|
| 2004/0153533 | A1* | 8/2004 | Lewis | 709/223 |
| 2010/0131650 | A1* | 5/2010 | Pok et al. | 709/226 |

FOREIGN PATENT DOCUMENTS

| | | |
|---|---|---|
| EP | 2 571 195 A1 | 3/2013 |
| WO | 2011/141586 A1 | 11/2011 |

OTHER PUBLICATIONS

IEEE; A "GAP-Model" based Framework for Online VVoIP QoE Measurement; Prasad Calyam, et al.; Journal of Communications and Networks, vol. 9, No. 4, Dec. 2007.
International Search Report and Written Opinion international application No. PCT/EP2013/055053 dated Jun. 25, 2013.

\* cited by examiner

*Primary Examiner* — Alan Chen
(74) *Attorney, Agent, or Firm* — Squire Patton Boggs (US) LLP

(57) ABSTRACT

Embodiments of the invention utilize advanced statistical data analytics to predict and provide recommendations for root-cause analysis for service access QoE issues in networks, such as 3G/4G networks. Using FCAPS data as predictor variables, embodiments are configured to set up the problem as a predictive regression or classification problem to estimate service access QoE related indicators. Some embodiments perform training and tuning of various non-linear statistical modelling algorithms, based for example on tree and ensemble methods, using network deregistration information from RAN logs.

18 Claims, 3 Drawing Sheets

METHOD AND SYSTEM FOR PREDICTION AND ROOT CAUSE RECOMMENDATIONS OF SERVICE ACCESS QUALITY OF EXPERIENCE ISSUES IN COMMUNICATION NETWORKS

CROSS REFERENCE TO RELATED APPLICATIONS

This application claims the benefit of U.S. Provisional Application No. 61/609,529, filed on Mar. 12, 2012. The contents of this earlier filed application are hereby incorporated by reference in its entirety.

BACKGROUND

1. Field

Embodiments of the invention generally relate to communication networks and, more specifically, to network management and operations, as well as data analytics and machine learning.

2. Description of the Related Art

Communication networks provide network performance data to enable the monitoring and managing of the network. Fault, configuration, administration, performance, and security (FCAPS) is the international organization for standardization's (ISO) telecommunications management network model and framework for network management. Fault, configuration, administration, performance, and security are the management categories into which the ISO model defines network management tasks.

Fault management is used to recognize, isolate, correct and log faults that occur in a communications network. Fault management may use trend analysis to predict errors so that the network is always available.

Configuration management may include the gathering and storing configurations from network devices, identifying ways in which to simplify the configuration of devices, tracking configuration changes, and planning for expansion and scaling.

Accounting management bills users or customers based on their usage statistics. Accounting management may also ensure that usage quotas are enforced.

Performance management monitors and determines the efficiency of the network, and may prepare the network for future requirements. Network performance includes, for example, the throughput, percentage utilization, error rates and response times.

Security management generally refers to the procedures for controlling access to elements of the network. These procedures may include authentication and encryption, for example.

The deregistration of services/devices used by consumers or users for abnormal reasons causes service access issues and can significantly impact the quality of experience (QoE) for the user. As a result, network service providers utilize FCAPS data for the monitoring, analysis, and performing of corrective actions for abnormal network deregistration. Such events may happen, for example, during network entry/session establishment, when a session is in progress, or upon handover during a session in progress. Network deregistration can be initiated by mobile devices or stations, network elements in the radio access network (RAN), the core network, and/or the serving entity.

SUMMARY

One embodiment is directed to a method including receiving fault, configuration, administration, performance, and security (FCAPS) data, and receiving session logs. The method also includes categorizing, partitioning, and preparing the fault, configuration, administration, performance, and security (FCAPS) data into an input set and output set configured for generating offline and online prediction, and for providing offline root cause recommendations of service access quality of experience (QoE) issues. The method may then include offline training, evaluating, and validating of a model configured for learning in areas of the service access quality of experience (QoE) issues, based on the output set, and utilizing the trained, evaluated, and validated model to execute a prediction function to provide the offline root cause recommendations for the service access quality of experience (QoE) issues.

Another embodiment is directed to an apparatus. The apparatus includes at least one processor, and at least one memory including computer program code. The at least one memory and computer program code, with the at least one processor, cause the apparatus at least to receive fault, configuration, administration, performance, and security (FCAPS) data, and to receive session logs. The apparatus is further caused to categorize, partition, and prepare the fault, configuration, administration, performance, and security (FCAPS) data into an input set and output set configured for generating offline and online prediction, and for providing offline root cause recommendations of service access quality of experience (QoE) issues. The apparatus is also caused to offline train, evaluate, and validate a model configured for learning in areas of the service access quality of experience (QoE) issues, based on the output set, and to utilize the trained, evaluated, and validated model to execute a prediction function to provide the offline root cause recommendations for the service access quality of experience (QoE) issues.

Another embodiment includes an apparatus. The apparatus includes means for receiving fault, configuration, administration, performance, and security (FCAPS) data, and receiving session logs. The apparatus also includes means for categorizing, partitioning, and preparing the fault, configuration, administration, performance, and security (FCAPS) data into an input set and output set configured for generating offline and online prediction, and for providing offline root cause recommendations of service access quality of experience (QoE) issues. The apparatus may further include means for offline training, evaluating, and validating of a model configured for learning in areas of the service access quality of experience (QoE) issues, based on the output set, and means for utilizing the trained, evaluated, and validated model to execute a prediction function to provide the offline root cause recommendations for the service access quality of experience (QoE) issues.

Another embodiment is directed to a computer program embodied on a computer readable medium. The computer program is configured to control a processor to perform a process. The process includes receiving fault, configuration, administration, performance, and security (FCAPS) data, and receiving session logs. The process also includes categorizing, partitioning, and preparing the fault, configuration, administration, performance, and security (FCAPS) data into an input set and output set configured for generating offline and online prediction, and for providing offline root cause recommendations of service access quality of experience (QoE) issues. The process may then include offline training, evaluating, and validating of a model configured for learning in areas of the service access quality of experience (QoE) issues, based on the output set, and utilizing the trained, evaluated, and validated model to execute a prediction function to provide the offline root cause recommendations for the service access quality of experience (QoE) issues.

BRIEF DESCRIPTION OF THE DRAWINGS

For proper understanding of the invention, reference should be made to the accompanying drawings, wherein.

DETAILED DESCRIPTION

Figure 1:
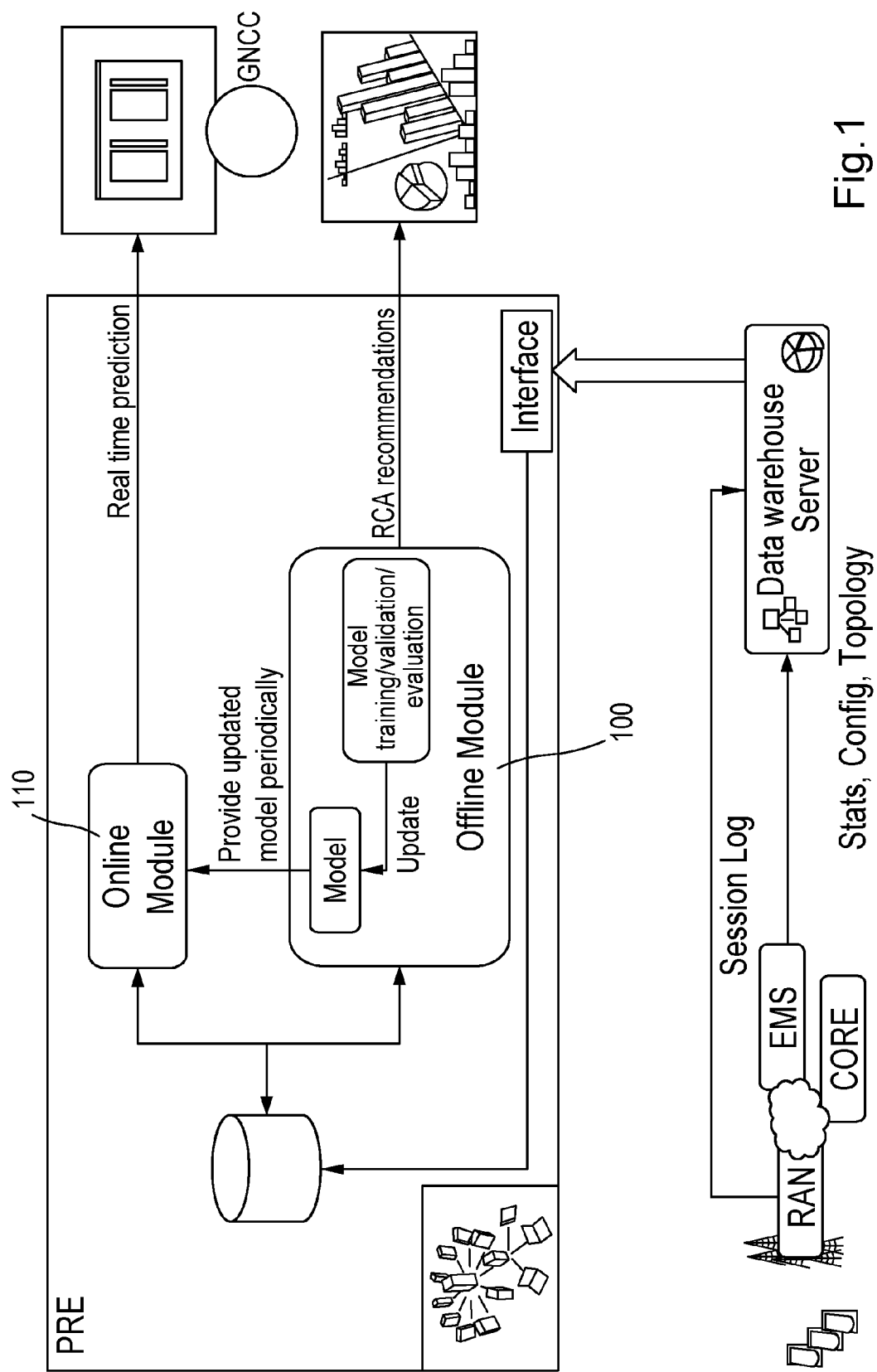
FIG. 1 illustrates a system according to one embodiment of the invention.

It will be readily understood that the components of the invention, as generally described and illustrated in the figures herein, may be arranged and designed in a wide variety of different configurations. Thus, the following detailed description of the embodiments of a system, a method, an apparatus, and a computer program product that predict and provide recommendations for root-cause analysis for service access quality of experience issues in communication networks, as represented in the attached figures, is not intended to limit the scope of the invention, but is merely representative of selected embodiments of the invention.

If desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Service providers can extract network de-registration information from logs collected at the RAN and perform analysis to identify root cause network deregistration issues. However, service providers and vendors face at least the following problems with this approach.

All of the data collected from the network, such as the network de-registration information, is post-processed and manually analyzed. The size of the data makes such analysis very difficult and time consuming. For example, there are numerous types of deregistration depending on the network. A worldwide interoperability for microwave access (WiMAX) network has 309 different deregistration (DEREG) codes that can be reported as cause/type of deregistration. In Long term evolution (LTE) networks, just radio resource control (RRC) has 25 or more causes for release/rejects (e.g., Rejection (1), Release (6), Failure (8), Protocol Error cause ((6), Inter-RAT change failure (4), . . . , etc.).

Additionally, the size of the market can make dealing with de-registration issues difficult. For example, the city of Chicago has 3500 WiMAX access points (APs) which generate 2.5 GB PM stat data and 1.5 GB of deregistration logs for a duration of 3 weeks.

As a result, each vendor/service provider/customer must take extraordinary steps to monitor deregistrations. Typically, databases are developed to manage data and present reports.

Customer premises equipment (CPE) de-registration key performance indicators (KPI) is insufficient in root cause analysis. Cryptic cause codes require extraordinary analysis and require frequent tapping in to vendor expertise, thereby placing a drain on vendor profits. As such, software analysis and testing (SWAT) teams are required for all key customers.

Moreover, traditional statistical methods are rendered ineffective due to time and cost, as well as simply an inability to even identify areas for nose dive for root cause.

In view of the above, certain embodiments of the invention present a full solution to provide intelligent network management functionality for communications networks, which uses different machine learning algorithms as the modeling engine. Some embodiments model user experienced outages and de-registrations using network statistics as inputs, and provide both an online recommendation and visualization tool, as well as an offline report generation engine.

One embodiment utilizes advanced statistical data analytics to predict and provide recommendations for root-cause analysis for service access QoE issues in networks, such as 3G/4G networks. Using FCAPS data as predictor variables, some embodiments are configured to set up the problem as a predictive regression or classification problem to estimate service access QoE related indicators. Some embodiments perform training and tuning of various non-linear statistical modelling algorithms, based for example on tree and ensemble methods, using network deregistration information from RAN logs.

As illustrated in FIG. 1, embodiments may include two modules, an offline module 100 and an online prediction module 110. In some embodiments, offline module 100 and online prediction module 110 may include software code or executable instructions configured to be executed by a processor implemented in hardware. As such, offline module 100 and online prediction module 110 may be a combination of hardware and software. In other embodiments, offline module 100 and online prediction module 110 may be entirely implemented in hardware, such as in an application specific integrated circuit (ASIC), a programmable gate array (PGA), a field programmable gate array (FPGA), etc.

The offline module 100 includes statistical model training and tuning based on historical data collected by servers. In one embodiment, the offline module 100 is configured to output a root cause recommendation for various categories of service access QoE issues. The online prediction module 110 uses the tuned model provided by the offline module 100 to output estimated service access QoE indicators using real time data.

Figure 2:
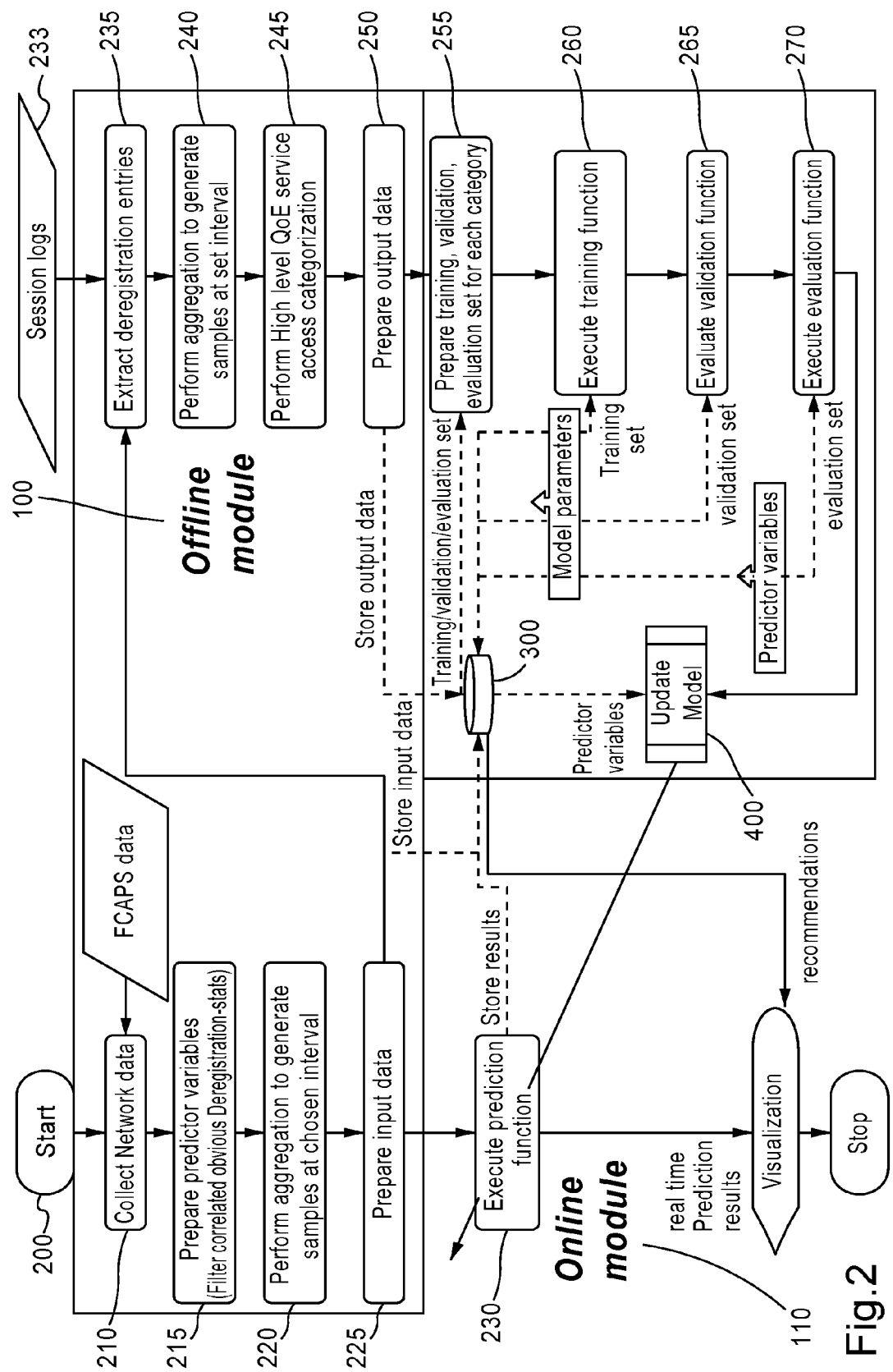
FIG. 2 illustrates a flow diagram a method according to one embodiment.

FIG. 2 illustrates the functionality of the offline module 100 and the online prediction module 110, according to one embodiment. According to this embodiment, online prediction module 110 collects network data including FCAPS data, prepares predictor variables, performs aggregation to generate samples at a chosen interval, and prepares and provides the input data to offline module 100. From session logs, offline module 100 extracts the de-registration entries. Offline module 100 may then perform aggregation to generate samples at set intervals, perform high level QoE service access categorization, prepare output data, and prepare a training and validation evaluation set for each category. Offline module 100 may then execute a training function, execute a validation function, execute an evaluation function, and update the model.

In an embodiment, the updated model is provided to online prediction module 110 which uses the updated model provided by the offline module 100 to output real time prediction results, i.e., estimated service access QoE indicators using real time data.

More specifically, FIG. 2 illustrates an example of a flow chart of a method that may be performed by the online module 110 in conjunction with the offline module 100. In this example, the method begins at 200 and, at 210, network FCAPS data 205 is collected. At 215, the method may include preparing predictor variables and, at 220, performing aggregation to generate samples at chosen interval(s). At 225, the input data set is prepared. The method may then proceed, at 235, to extracting deregistration entries from session logs 233. At 240, the method may include performing aggregation to generate samples at set interval(s) and, at 245, performing high level QoE service access categorization. The method may include, at 250, preparing an output data set. In an embodiment, the input data and output data sets are stored in a database 300. The method may further include, at 255, preparing training, validation, and evaluation set for each category as categorized in step 245. At 260, 265, and 270, a training function, validation function, and evaluation function may be executed and utilized to update model 400. The updated model 400 may then be used to execute the prediction function at 230. In one embodiment, the results of the prediction function may also be stored in database 300.

Thus, embodiments of the invention provide a method, apparatus, and/or computer program product that generates, creates, and/or provides a prediction and root cause recommendation for service access QoE related issues in a communication network. One embodiment applies advance statistical data analytics, using FCAPS data as predictor variables, and sets up the problem as a predictive regression or classification problem to estimate service access QoE related indicators. Certain embodiments utilize historic FCAPS data to create an input set as well as utilizes information from RAN logs to create an output set for the purpose of training, evaluating and validating a model offline for generation of recommendations for root cause analysis of service access QoE issues. Embodiments may then apply the model created offline, with real time FCAPS data in order to predict service access QoE issues. This information may then be provided for visualization, offline analysis, monitoring and deep dives for root cause analysis.

One embodiment is directed to a method for prediction and root cause recommendations of service access QoE issues in a communication network. The method includes receiving and utilizing FCAPS data in offline (historic) and online mode from network management entities, and receiving session logs from network elements. The method further includes categorizing, partitioning, and preparing the data into input and output sets such that the data can be utilized for generating offline and online prediction, and can be used for providing root cause recommendations. The method may also include offline training, evaluating, and validating of the model built using machine learning algorithms with a combination of supervised as well as unsupervised approaches, where the model is built for learning in the area of service access QoE issues. The method further includes utilizing the trained model for offline root cause recommendations for service access QoE issues and visualization, and utilizing the offline trained model and its results towards online prediction for service access QoE issues and visualization.

In some embodiments, the functionality of any of the methods described herein may be implemented by software stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

The computer readable media mentioned above may be at least partially embodied by a transmission line, a compact disk, digital-video disk, a magnetic disk, holographic disk or tape, flash memory, magnetoresistive memory, integrated circuits, or any other digital processing apparatus memory device.

Figure 3:
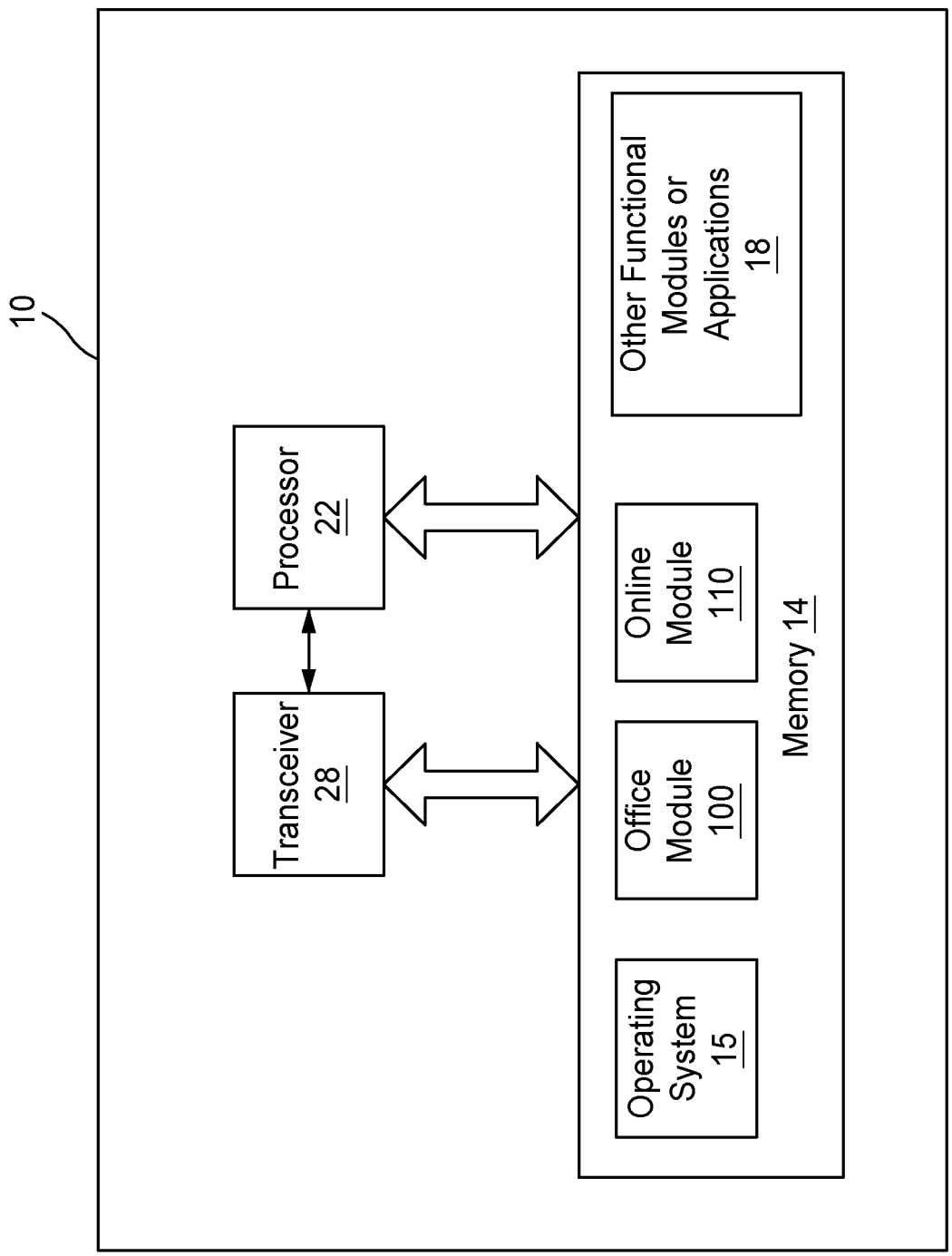
FIG. 3 illustrates an apparatus according to one embodiment.

FIG. 3 illustrates an apparatus 10 according to one embodiment. In an embodiment, apparatus 10 may be a network element or entity configured to predict and provide recommendations for root cause analysis for service access QoE issues in a network. For example, according to an embodiment, apparatus 10 may be a network element, such as an application server in the network management domain. In some embodiments, the functionality provided by apparatus 10 would reside in the customer experience management (CEM) and/or operational support system (OSS) layer of the network management system or element management system, or an application server linked to other elements of the network, such as OSS, Core and RAN.

Apparatus 10 includes a processor 22 for processing information and executing instructions or operations. Processor 22 may be any type of general or specific purpose processor. While a single processor 22 is shown in FIG. 3, multiple processors may be utilized according to other embodiments. In fact, processor 22 may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as examples.

Apparatus 10 further includes a memory 14, coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory ("RAM"), read only memory ("ROM"), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas (not shown) for transmitting and receiving signals and/or data to and from apparatus 10. Apparatus 10 may further include a transceiver 28 that modulates information on to a carrier waveform for transmission by the antenna(s) and demodulates information received via the antenna(s) for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include the offline module 100 and online prediction module discussed above. The modules may also include an operating system 15 that provides operating system functionality for apparatus 10. The memory may also store one or more functional modules 18, such as an application or program, to provide additional functionality for apparatus 10. The components of apparatus 10 may be implemented in hardware, or as any suitable combination of hardware and software.

According to one embodiment, apparatus 10 may be configured to receive and utilize FCAPS data in offline (historic) and online mode from network management entities and to receive session logs from network elements. Apparatus 10 may be further configured to categorize, partition, and prepare the data into input and output sets such that the data can be utilized towards generating offline and online prediction and providing root cause recommendations. Apparatus 10 may also be configured to offline train, evaluate and validate the model built using machine learning algorithms with a combination of supervised as well as unsupervised approaches, where the model is built for learning in the area of service access QoE issues. Apparatus 10 may then utilize the trained model for offline root cause recommendations for service access QoE issues and visualization. Further, apparatus 10 can utilize the offline trained model and apply its results towards online prediction for service access QoE issues and visualization.

In view of the above, embodiments of the invention can aid managed service providers (GNOCs/SOCs), optimization service providers, and operators in building an expert system to understand leading indicators impacting end user services as well as bring significant efficiency in performing root cause analysis of network management problems. Embodiments of the invention can be adopted in tools provided to operators. Additionally, embodiments will allow for the performance of a onetime analysis to produce a report. Importantly, embodiments will result in faster root cause analysis and better monitoring of a multi-vendor network from GNOCs/SOCs. As a result, the profit drain that goes in to solving field issues will be reduced by shortening the time to root cause analysis. The shorter analysis period will also result in faster response time to customer issues.

It should be noted that some of the functional features described in this specification have been presented as modules, functions or applications, in order to more particularly emphasize their implementation independence. For example, a module, function or application may be implemented as a hardware circuit comprising custom VLSI circuits or gate arrays, off-the-shelf semiconductors such as logic chips, transistors, or other discrete components. A module, function or application may also be implemented in programmable hardware devices such as field programmable gate arrays, programmable array logic, programmable logic devices or the like.

Modules, functions or applications may also be partially or completely implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve its stated purpose.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
receiving fault, configuration, administration, performance, and security (FCAPS) data;
receiving session logs;
categorizing, partitioning, and preparing the fault, configuration, administration, performance, and security (FCAPS) data into an input set and output set configured for generating offline and online prediction, and for providing offline root cause recommendations of service access quality of experience (QoE) issues;
offline training, evaluating, and validating of a model configured for learning in areas of the service access quality of experience (QoE) issues, based on the output set; and
utilizing the trained, evaluated, and validated model to execute a prediction function to provide the offline root cause recommendations for the service access quality of experience (QoE) issues.

2. The method according to claim 1, wherein the receiving of the fault, configuration, administration, performance, and security (FCAPS) data comprises receiving the fault, configuration, administration, performance, and security (FCAPS) data in online and offline mode from at least one network management entity.

3. The method according to claim 1, wherein the receiving of the session logs comprises receiving the session logs from at least one network element.

4. The method according to claim 1, further comprising extracting deregistration entries from the session logs.

5. The method according to claim 1, further comprising storing the input set and the output set in a database.

6. The method according to claim 1, wherein the input set is prepared by an online module and the output set is prepared by an offline module.

7. An apparatus, comprising:
at least one processor; and
at least one memory comprising computer program code,
the at least one memory and the computer program code configured, with the at least one processor, to cause the apparatus at least to
receive fault, configuration, administration, performance, and security (FCAPS) data;
receive session logs;
categorize, partition, and prepare the fault, configuration, administration, performance, and security (FCAPS)

data into an input set and output set configured for generating offline and online prediction, and for providing offline root cause recommendations of service access quality of experience (QoE) issues;

offline train, evaluate, and validate a model configured for learning in areas of the service access quality of experience (QoE) issues, based on the output set; and utilize the trained, evaluated, and validated model to execute a prediction function to provide the offline root cause recommendations for the service access quality of experience (QoE) issues.

8. The apparatus according to claim 7, wherein the at least one memory and the computer program code are further configured, with the at least one processor, to cause the apparatus to receive the fault, configuration, administration, performance, and security (FCAPS) data in online and offline mode from at least one network management entity.

9. The apparatus according to claim 7, wherein the at least one memory and the computer program code are further configured, with the at least one processor, to cause the apparatus to receive the session logs from at least one network element.

10. The apparatus according to claim 7, wherein the at least one memory and the computer program code are further configured, with the at least one processor, to cause the apparatus to extract deregistration entries from the session logs.

11. The apparatus according to claim 7, wherein the at least one memory and the computer program code are further configured, with the at least one processor, to cause the apparatus to store the input set and the output set in a database.

12. The apparatus according to claim 7, wherein the apparatus further comprises an online module configured to prepare the input set, and an offline module configured to prepare the output set.

13. A non-transitory computer readable storage medium encoded with a computer program configured to control a processor to perform a process, comprising:

receiving fault, configuration, administration, performance, and security (FCAPS) data;

receiving session logs;

categorizing, partitioning, and preparing the fault, configuration, administration, performance, and security (FCAPS) data into an input set and output set configured for generating offline and online prediction, and for providing offline root cause recommendations of service access quality of experience (QoE) issues;

offline training, evaluating, and validating of a model configured for learning in areas of the service access quality of experience (QoE) issues, based on the output set; and utilizing the trained, evaluated, and validated model to execute a prediction function to provide the offline root cause recommendations for the service access quality of experience (QoE) issues.

14. The non-transitory computer readable medium according to claim 13, wherein the receiving of the fault, configuration, administration, performance, and security (FCAPS) data comprises receiving the fault, configuration, administration, performance, and security (FCAPS) data in online and offline mode from at least one network management entity.

15. The non-transitory computer readable medium according to claim 13, wherein the receiving of the session logs comprises receiving the session logs from at least one network element.

16. The non-transitory computer readable medium according to claim 13, further comprising extracting deregistration entries from the session logs.

17. The non-transitory computer readable medium according to claim 13, further comprising storing the input set and the output set in a database.

18. The non-transitory computer readable medium according to claim 13, wherein the input set is prepared by an online module and the output set is prepared by an offline module.

* * * * *